United States Patent
Park (10) Patent No.: US 10,713,346 B2
(45) Date of Patent: Jul. 14, 2020

(54) SYSTEM FOR USER AUTHENTICATION BASED ON LOCK SCREEN AND THE METHOD THEREOF

(71) Applicant: SEOWOOSNC CO., Ltd., Seoul (KR)

(72) Inventor: Ji Min Park, Gwangju-si (KR)

(73) Assignee: SEOWOOSNC CO., LTD., Seoul (KR)

( * ) Notice: Subject to any disclaimer, the term of this patent is extended or adjusted under 35 U.S.C. 154(b) by 0 days.

(21) Appl. No.: 16/492,970

(22) PCT Filed: Aug. 29, 2017

(86) PCT No.: PCT/KR2017/009452
§ 371 (c)(1),
(2) Date: Sep. 11, 2019

(87) PCT Pub. No.: WO2018/169150
PCT Pub. Date: Sep. 20, 2018

(65) Prior Publication Data
US 2020/0012773 A1    Jan. 9, 2020

(30) Foreign Application Priority Data

Mar. 17, 2017   (KR) .................. 10-2017-0033924

(51) Int. Cl.
*G06F 21/32* (2013.01)
*G06F 21/45* (2013.01)
(Continued)

(52) U.S. Cl.
CPC .............. *G06F 21/32* (2013.01); *G06F 21/45* (2013.01); *G06K 9/00006* (2013.01); *H04L 63/0861* (2013.01); *G06F 2221/2111* (2013.01)

(58) Field of Classification Search
CPC .. G06F 3/04817; G06F 3/0488; G06F 21/606; G06Q 30/0262; G06Q 30/0267;
(Continued)

(56) References Cited

U.S. PATENT DOCUMENTS

2014/0173714 A1* 6/2014 Nakao .................... G06F 21/31
726/16
2018/0114046 A1* 4/2018 Shimada ............... G06F 3/0485

FOREIGN PATENT DOCUMENTS

JP          2014-119897 A     6/2014
KR    10-2014-0092172 A     7/2014
(Continued)

*Primary Examiner* — Abiy Getachew
(74) *Attorney, Agent, or Firm* — Novick, Kim & Lee, PLLC; Sang Ho Lee (57) ABSTRACT

Provided is a system for authenticating a user based on a lock screen and a method thereof, and more particularly, to a system for authenticating a user and a method thereof, which operates a user terminal even in a locked state of the user terminal in order to perform user authentication more easily. A system for authenticating a user based on a lock screen may include a push server receiving identification information of a user who accesses an authentication request server and identification information of the authentication request server and generating a push message based on the identification information and transmitting the push message to the user terminal corresponding to the identification information of the user.

10 Claims, 6 Drawing Sheets

(51) Int. Cl.
*G06K 9/00* (2006.01)
*H04L 29/06* (2006.01)

(58) Field of Classification Search
CPC . G06Q 30/0643; H04L 63/0861; H04L 51/04; H04L 51/38; H04L 63/02; H04L 63/0442; H04L 63/0823; H04M 1/67; H04M 1/72522; H04M 2250/22; H04W 12/06; H04W 12/0027; H04W 12/0602; H04W 12/0608; H04W 12/0609; H04W 12/08; H04W 12/12; H04W 4/50; H04W 8/22
See application file for complete search history.

(56) References Cited

FOREIGN PATENT DOCUMENTS

| | | |
|---|---|---|
| KR | 10-2015-0124868 A | 11/2015 |
| KR | 10-1661189 B1 | 9/2016 |
| KR | 10-1673529 B1 | 11/2016 |
| KR | 10-1673536 B1 | 11/2016 |

\* cited by examiner

SYSTEM FOR USER AUTHENTICATION BASED ON LOCK SCREEN AND THE METHOD THEREOF

TECHNICAL FIELD

The present disclosure relates to a system for authenticating a user based on a lock screen and a method thereof, and more particularly, to a system for authenticating a user and a method thereof, which operate a user terminal even in a locked state of the user terminal in order to perform user authentication more easily.

BACKGROUND ART

Security is a problem in various fields such as financial services, entrance to the front door and an in-house electronic payment system. As a general security method, there is a method of checking an ID and a password of a user, but in the method, the ID and the password may be exposed by attack means such as hacking, SMiShing, and pharming of the ID and the password.

Therefore, additional authentication means for authenticating an identity of the user is required, which representatively includes OTP, IPIN, ARS, and the like.

However, the additional authentication means cannot be completely avoided from the hacking or the SMiShing and a process of an additional authentication method is considerably complicated and troublesome, which gives inconvenience to the user.

In order to enhance such a security problem, a user authentication means using biometric information such as fingerprint recognition has been developed, but the user authentication means is limited to the use of a device for providing a fingerprint recognition function (Korean Patent Unexamined Publication No. 10-2015-0124868) and there is a problem that the user can be authenticated after releasing a lock screen of a portable terminal.

DISCLOSURE OF INVENTION

Technical Problem

An object to be achieved by the present disclosure is to provide a system for authenticating a user and a method thereof, for the user to perform user authentication by immediately providing biometric information to a user terminal in a state of a locked state of a screen without releasing a lock screen of the user terminal when a push message related to user authentication is transmitted to the user terminal.

The technical objects of the present disclosure are not restricted to the aforementioned technical objects, and other objects of the present disclosure, which are not mentioned above, will become more apparent to one of ordinary skill in the art to which the present disclosure pertains by referencing the detailed description of the present disclosure given below.

Solution to Problem

According to an aspect of the present disclosure, a method for authenticating a user based on a lock may include: (a) receiving, by a push server, identification information of a user who accesses an authentication request server and identification information of the authentication request server; (b) generating, by the push server, a push message based on the identification information and transmitting the push message to the user terminal corresponding to the identification information of the user; (c) displaying, by the user terminal, the transmitted push message on a lock screen; (d) performing, by the user terminal, authentication of the user by receiving biometric information of the user and comparing the received biometric information with the biometric information which is pre-stored; and (e) receiving, by the push server, authentication result information for the user from the user terminal and transmitting the received authentication result information to the authentication request server.

According to an aspect of the present disclosure, in (c) the displaying of the push message on the lock screen of the user terminal, an object in a full-screen mode may be overlaid on the lock screen, the push message may be displayed on the object, and in (d) the performing of the authentication of the user, when the authentication of the user is completed, the object in the full-screen mode and the push message are closed, and as a result, the user terminal may be returned to a lock screen state.

According to an aspect of the present disclosure, the authentication request server may be at least any one of a financial service server, an entrance management server, a security server, a computing system, a web site server, a content providing server, a cloud server, an IoT hub server, a personal information management server, and a messenger app server.

According to an aspect of the present disclosure, the biometric information may be at least one of a fingerprint, a voice, an iris, a face image, a vein, and a retina.

According to an aspect of the present disclosure, in (d) the performing of the authentication of the user, when the user terminal additionally receives location information of the user and the location information is included in a predetermined radius, the authentication of the user may be performed, wherein the location information may be acquired through a GPS of the user terminal, information on a base station of a mobile communication network to which the user terminal belongs, and beacon information received by the user terminal.

According to another aspect of the present disclosure, a system for authenticating a user based on a lock screen may include: a push server receiving identification information of a user who accesses an authentication request server and identification information of the authentication request server and generating a push message based on the identification information and transmitting the push message to the user terminal corresponding to the identification information of the user, in which the push server may include an application providing unit installing an application for performing user authentication in response to the push message in the user terminal, wherein the application may perform the authentication of the user by displaying the transmitted push message on the lock screen of the user terminal, and receiving biometric information and comparing the received biometric information with the biometric information which is pre-stored, wherein the push server may receive authentication result information for the user from the user terminal and transmit the received authentication result information to the authentication request server.

According to another aspect of the present disclosure, the push server further may include a request information identifying unit receiving the identification information of the user who accesses the authentication request server and identifying whether the identification information corresponds to a user who installs the application in the user terminal, a push message transmitting unit transmitting the push message to the user terminal when the identification information of the user corresponds to the user who installs the application in the user terminal through the request information identifying unit, and an authentication result notifying unit receiving, from the user terminal, authentication result information for the user performed in response to the push message transmitted to the user terminal and transmitting the received authentication result information to the authentication request server.

According to another aspect of the present disclosure, the application may overlay an object in a full-screen mode on the lock screen of the user terminal, the push message may be displayed on the object, and when the authentication of the user is completed, the object in the full-screen mode and the push message are closed, and as a result, the user terminal may be returned to a lock screen state.

According to another aspect of the present disclosure, when the application additionally receives location information of the user and the location information is included in a predetermined radius, the authentication of the user may be performed, and the location information may be acquired through a GPS of the user terminal, information on a base station of a mobile communication network to which the user terminal belongs, and beacon information received by the user terminal.

Advantageous Effects of Invention

According to an embodiment of the present disclosure, in a system for authenticating a user based on a lock screen and a method thereof, a user immediately may provide biometric information to a user terminal to perform user authentication even in a locked state of a screen of a user terminal without releasing the lock screen of the user terminal.

Therefore, the user can easily and quickly perform the user authentication without a hassle of releasing the lock screen of a terminal.

According to an embodiment of the present disclosure, in a system for authenticating a user based on a lock screen and a method thereof, since unique biometric information of the user, such as fingerprint authentication is utilized, a more secure user authentication method can be provided from phishing or hacking.

Furthermore, according to the present disclosure, since when the user accesses a server that requests authentication, a push message related to the user authentication is transmitted to the user terminal to be utilized as an additional authentication means, thereby enhancing security for the server access.

DESCRIPTION OF EMBODIMENTS

Hereinafter, preferred embodiments of the present disclosure will be described in detail with reference to the accompanying drawings. Advantages and features of the present disclosure, and methods for accomplishing the same will be more clearly understood from embodiments described in detail below with reference to the accompanying drawings. However, the present disclosure is not limited to the embodiments set forth below, and may be embodied in various different forms. The present embodiments are just for rendering the disclosure of the present disclosure complete and are set forth to provide a complete understanding of the scope of the invention to a person with ordinary skill in the technical field to which the present disclosure pertains, and the present disclosure will only be defined by the scope of the claims. Throughout the whole specification, the same reference numerals denote the same elements.

Unless otherwise defined, all terms (including technical and scientific terms) used in the present specification may be used as the meaning which may be commonly understood by the person with ordinary skill in the art, to which the present disclosure pertains. Terms defined in commonly used dictionaries should not be interpreted in an idealized or excessive sense unless expressly and specifically defined.

Further, in this specification, singular forms include even plural forms unless the context clearly indicates otherwise. It is to be understood that the terms 'comprise' and/or 'comprising' used in the specification are intended to be inclusive in a manner that does not exclude the presence of stated components, steps, operations, and/or elements does not exclude the addition.

Throughout the specification, "corresponding" may also include the meaning of 'performed as a set procedure according to a series of orders' and "equivalent" may be used as a meaning 'given information coincides with each other'.

Figure 1:
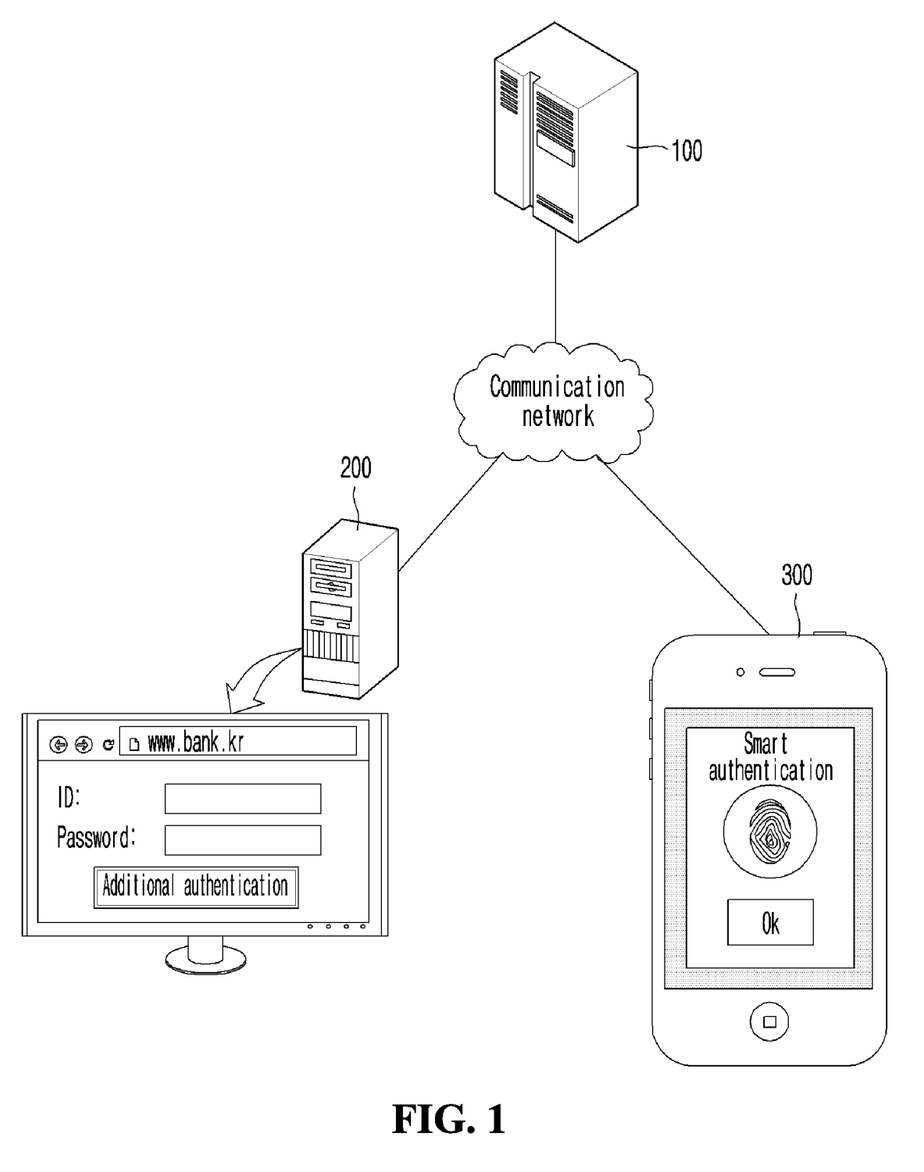
FIG. 1 is a conceptual diagram of a system for authenticating a user based on a lock screen and a method thereof according to an embodiment of the present disclosure.

FIG. 1 is a conceptual diagram of a system for authenticating a user based on a lock screen and a method thereof according to an embodiment of the present disclosure.

As illustrated in FIG. 1, in a system for authenticating a user based on a lock screen and a method thereof according to an embodiment of the present disclosure, an authentication request server 200, a push server 100, and a user terminal 300 are connected through a communication network to be controlled while transmitting and receiving information wirelessly or wired.

The authentication request server 200 may be a server to which a user wants to access and the push server 100 is a main server that provides the method for authenticating a user based on a lock screen according to an embodiment of the present disclosure, and the user terminal 300 may correspond to an apparatus in which the user performs lock screen-based user authentication according to an embodiment of the present disclosure.

When the method for authenticating a user based on a lock screen according to an embodiment of the present disclosure is described in brief, when the user accesses the authentication request server 200, identification information of the user and identification information of the authentication request server 200 may be transmitted from the authentication request server 200 to the push server 100 and the push server 100 may transmit a push message related to the user authentication to the user terminal 300 in response to the identification information. After the user authentication is performed in the user terminal 300, a result thereof is transmitted to the authentication request server 200 through the push server 100, thereby performing the user authentication. According to an embodiment of the present disclosure, when the user authentication is completed, the user may log in to the authentication request server 200.

Figure 2:
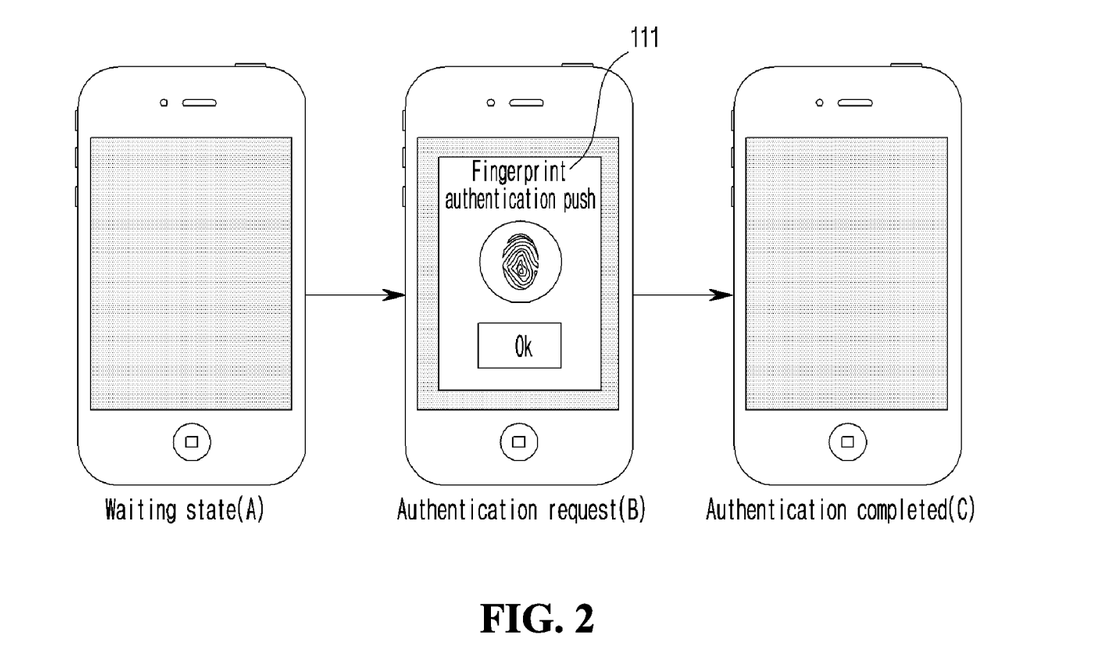
FIG. 2 is a diagram illustrating that a method for authenticating a user based on a lock screen is implemented in a user terminal according to an embodiment of the present disclosure.

FIG. 2 is a diagram illustrating that a method for authenticating a user based on a lock screen is implemented in a user terminal according to an embodiment of the present disclosure.

The method for authenticating a user based on a lock screen according to an embodiment of the present disclosure is a method in which a user push message 111 is displayed on the user terminal 300 in response to the push message transmitted to the user terminal 300 to perform the user authentication even in a lock screen state of the user terminal 300.

Referring to FIG. 2, when the user terminal 300 maintains the lock screen in a waiting state (A), the push message 111 for requesting the user authentication is displayed on the screen of the user terminal (B) and the user may immediately perform the user authentication such as fingerprint authentication without releasing the lock screen and when the user authentication is completed, the user terminal 300 may maintain the lock screen state again (C).

Figure 3:
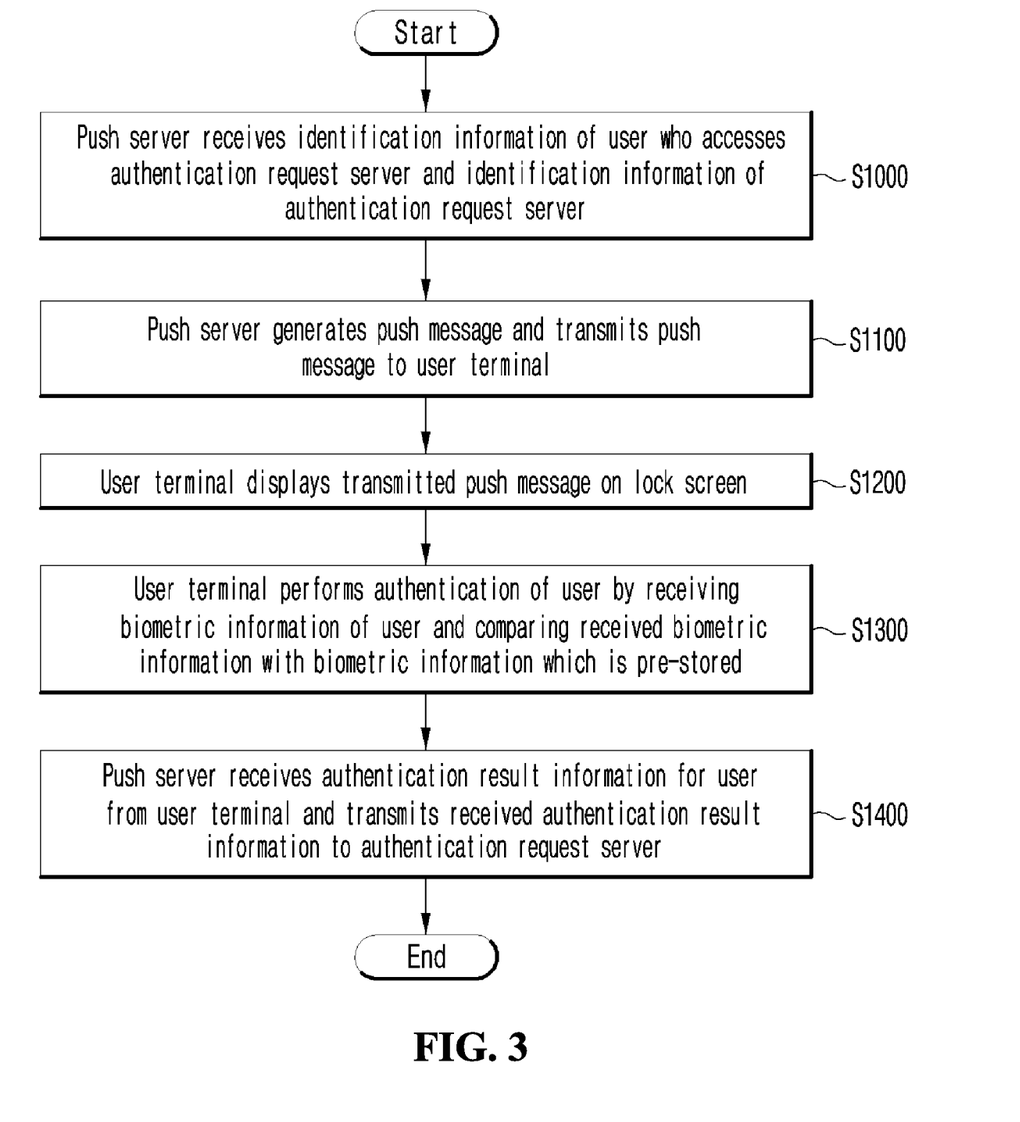
FIG. 3 is a flowchart of a method for authenticating a user based on a lock screen according to an embodiment of the present disclosure.

FIG. 3 is a flowchart of a method for authenticating a user based on a lock screen according to an embodiment of the present disclosure.

The method for authenticating a user based on a lock screen according to an embodiment of the present disclosure may include receiving, by a push server, identification information of a user who accesses an authentication request server and identification information of the authentication request server (S1000, a), generating, by the push server, a push message based on the identification information and transmitting the push message to the user terminal in response to the identification information of the user (S1100, b), displaying, by the user terminal, the transmitted push message on a lock screen (S1200, c), receiving, by the user terminal, biometric information of the user and comparing the received biometric information with the biometric information which is pre-stored to perform authentication of the user (S1300, d), and transmitting, by the push server, authentication result information for the user from the user terminal and transmitting the received authentication result information to the authentication request server (S1400, e).

The authentication request server 200 according to an embodiment of the present disclosure may be at least any one of a financial service server, an entrance management server, a security server, a computing system, a web site server, a content providing server, a cloud server, an IoT hub server, a personal information management server, and a messenger app server, but is not particularly limited thereto.

The biometric information according to an embodiment of the present disclosure may be at least any one of a fingerprint, a voice, an iris, a face image, a vein, and a retina, but is not limited thereto.

According to an embodiment of the present disclosure, when a user uses a financial service such as deposit/withdrawal or card settlement on the Internet, the authentication request server 200 according to an embodiment of the present disclosure may correspond to the financial service server operated by a bank company or a card company.

When the user accesses the financial service server and attempts the deposit/withdrawal or card settlement, the financial service server (authentication request server) may request the user authentication to the user terminal 300 through the push server 100.

According to another embodiment of the present disclosure, when the user touches an entrance card on a gate terminal at the time of passing through a gate in which the security is requested, the authentication request server 200 according to another embodiment of the present disclosure may correspond to the entrance management server. The entrance management server (authentication request server) may transmit the identification information of the user, which is read from the entrance card to the push server 100, and the push server 100 may transmit the push message related to the user authentication to the user terminal 300 based on the identification information of the user to request additional authentication to the user.

Accordingly, according to another embodiment of the present disclosure, since the user authentication is additionally performed through the user terminal 300 in addition to the entrance card, the security for entrance management may be enhanced.

According to another embodiment of the present disclosure, when the user reproduces personal streaming contents (e.g., a sound source or a moving picture opened only to a specific person), the authentication request server 200 according to another embodiment of the present disclosure may correspond to a content providing server. The content providing server (authentication request server) may read user identification information tagged to streaming contents and transmit the read user identification information to the push server 100 and the push server 100 may transmit the push message related to the user authentication to the user terminal 300 based on the user identification information. Accordingly, when the user passes through the user authentication through the user terminal 300, an authentication result is transmitted to the content providing server (authentication request server) through the push server 100 and an access right to the personal streaming contents is granted, and as a result, the user may reproduce the personal streaming contents.

According to another embodiment of the present disclosure, when the user accesses a public institution web site and outputs a document related to personal information, the authentication request server 200 according to another embodiment of the present disclosure may correspond to a personal information management server. The personal information management server (authentication request server) may transmit the identification information of the user who accesses the public institution web site to the push server 100 and the push server 100 may transmit the push message related to the user authentication to the user terminal 300 based on the user identification information to perform the user authentication.

According to another embodiment of the present disclosure, the method for authenticating a user based on a lock screen according to the present disclosure may be applied even to the Internet of Things (IoT). For example, when the user opens a car door by touching an electronic key with the car door, the IoT hub server that controls a lock device of the car door may correspond to the authentication request server 200. Accordingly, the IoT hub server (authentication request server) may transmit the user identification information to the push server 100 and the push server 100 may transmit the push message related to the user authentication to the user terminal to perform the user authentication. When the user authentication is completed, the car door may be opened.

According to another embodiment of the present disclosure, when the user checks the message in the lock state of the user terminal as the message is received in a user account 1, the authentication request server 200 according to another embodiment of the present disclosure may correspond to the messenger app management server. When the message is received in the user account, the messenger app management server (authentication request server) may request the user authentication to the user terminal 300 through the push server 100. Accordingly, the user may check the received message while completing the user authentication in the user terminal 300 in the lock screen state.

Hereinafter, an embodiment of the present disclosure describes a user authentication method requested when the user accesses a security server, an in-house computing system, or a web site server on the web site and logs in to the security server, the in-house computing system, or the web site server.

Figure 4:
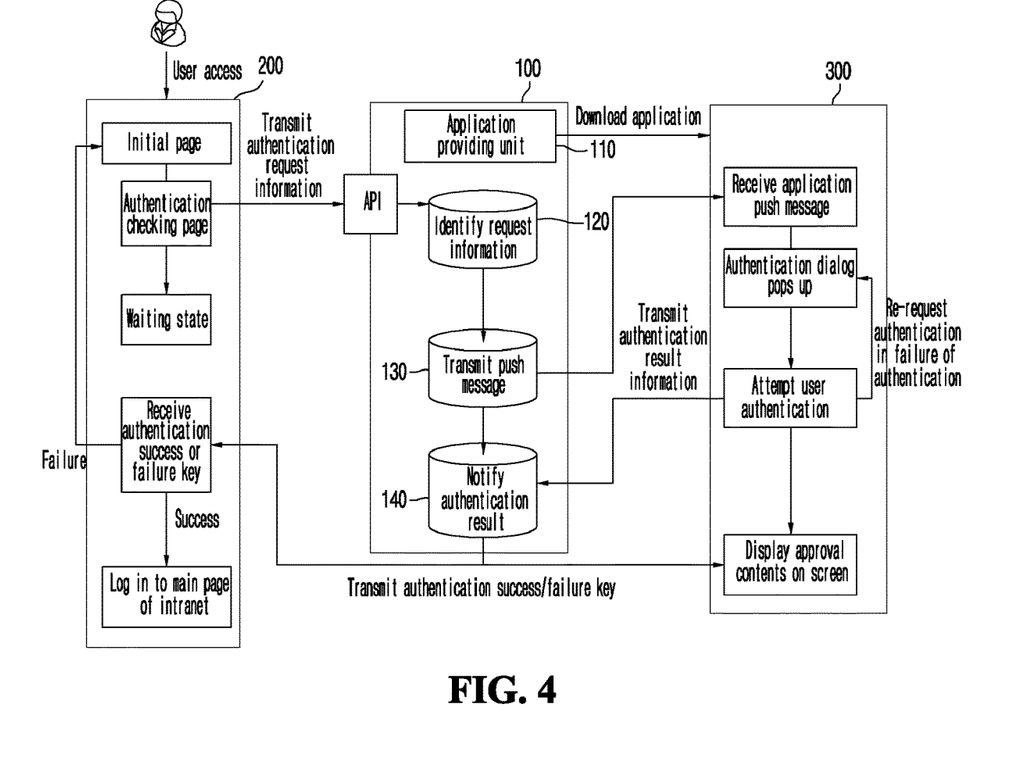
FIG. 4 illustrates a flow sequence of transmitted information according to an embodiment of the present disclosure.

FIG. 4 illustrates a flow sequence of transmitted information according to an embodiment of the present disclosure.

When the user accesses the authentication request server 200 and the authentication of the user is requested, the authentication request server 200 may transmit authentication request information (e.g., identification information of the user who accesses the authentication request server 200 and identification information of the authentication request server) to the push server 100. The authentication request information may be transmitted to the push server 100 through an application programming interface (API).

When the received user identification information is identified as corresponding to an application user according to an embodiment of the present disclosure, the push message may be transmitted to the user terminal of the user.

Meanwhile, the application may refer to a user application downloaded from an application providing unit 110 of the push server according to an embodiment of the present disclosure to the user terminal 300 or refer to a function installed in an operating system (OS) of the user terminal.

The push message according to an embodiment of the present disclosure relates to a message for requesting the user authentication and information to be authenticated may be encrypted according to a security level of the user and transmitted to the user terminal 300.

More specifically, the information to be authenticated may include information on the type of biometric information (for example, fingerprint, voice, iris, etc.), and also additionally include location information of the user according to the security level of the user.

Therefore, in the performing of the authentication of the user according to an embodiment of the present disclosure (d, S1300), the location information of the user is additionally received by the user terminal 300 and when the location of the user is included in a predetermined radius, the authentication of the user may be performed and the location information may be acquired through a GPS of the user terminal 300, information on a base station of a mobile communication network to which the user terminal belongs, and beacon information received by the user terminal 300.

Information on the predetermined radius may be included in the push message and transmitted from the push server 100 or pre-stored in the user terminal 300.

When the user terminal 300 receives the push message related to the user authentication, a dialog (e.g., push message) for requesting the authentication to the user may pop up on the lock screen of the user terminal 300.

Meanwhile, the form of a push message 111 which pops up on the lock screen of the user terminal 300 is referred to as a dialog, which is a term used in the technical field of the present disclosure and throughout the specification, an authentication dialog means a form in which the push message 111 pops up on the lock screen.

When the user attempts the authentication and the user terminal thus receives the biometric information of the user, the user authentication may be performed by comparing the received biometric information with the biometric information pre-stored in the user terminal 300.

Meanwhile, when the type of authentication is fingerprint recognition, the authentication may be performed by comparing a fingerprint image obtained by a method such as an optical, a silicon chip scheme, a thin-film scheme, etc., with a pattern of a fingerprint which is registered and stored in advance.

In addition, when the type of authentication is iris recognition, the authentication may be performed by comparing a pattern extracted by dividing a sector in an iris image input through an iris recognition camera with the pre-stored pattern of the iris.

Further, when the type of authentication is voice recognition, the user authentication may be performed by extracting features through signal processing such as frequency analysis with respect to a sound input through a recording terminal of the user terminal 300 and comparing the extracted features with stored voice features.

Authentication result information may be transmitted to the push server 100. Meanwhile, the authentication result information may include a key related to authentication success or failure, an authenticated time, location information (e.g., GPS information of the user terminal, communication base station information, Beacon information, etc.) of an authenticated time point, hardware information (e.g., a phone number, an OS, a model, and a version of the user terminal, etc.), and network information (e.g., Wi-Fi, IP, carrier, etc.).

The push server 100 may transmit the key related to the authentication success or failure to the authentication request server 200 again.

When the authentication request server 200 receives the authentication success key, the user may log in to a main page of the server, but when the authentication request server 200 receives the authentication failure key, the user may not log in to the main page of the server and may return to an initial page.

Figure 5:
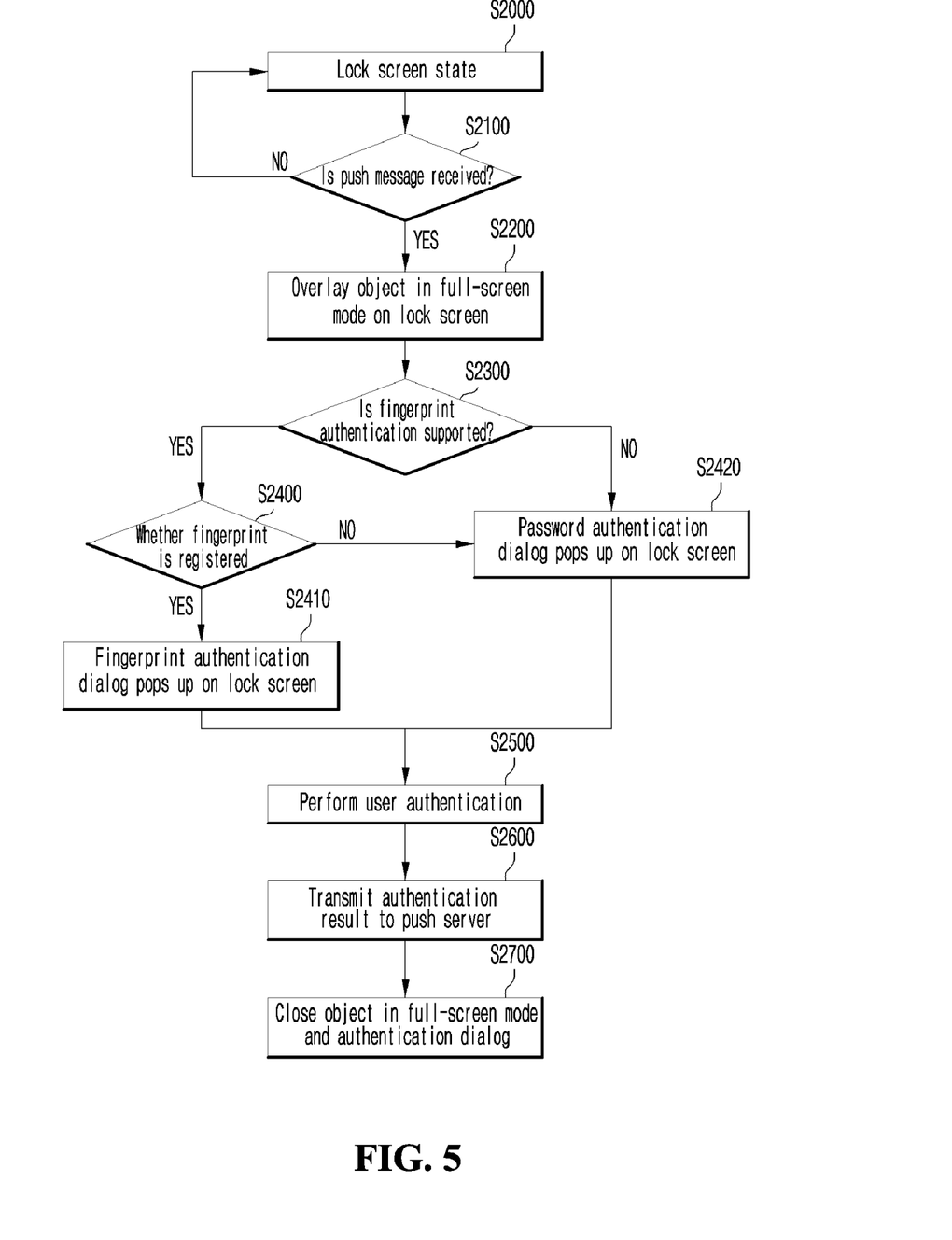
FIG. 5 is a flowchart in which a method for authenticating a user based on a lock screen is operated in a user terminal according to an embodiment of the present disclosure.

FIG. 5 is a flowchart in which a method for authenticating a user based on a lock screen is operated in a user terminal according to an embodiment of the present disclosure.

When the user terminal 300 receives the push message from the push server 100 in a lock screen state S2000 (S2100), the user terminal 300 may overlay an object in a full-screen mode on the lock screen (S2200) and display the authentication dialog on the object.

In this case, when the user terminal 300 determines whether a biometric information recognition technique is supported (S2300, e.g., fingerprint authentication) and supports the biometric information recognition technique, if there is biometric information registered in advance in the user terminal 300 (S2400), a biometric information authentication dialog may pop up on the lock screen (S2410).

On the other hand, when the user terminal 300 does not support the biometric information recognition technique (S2300) or there is no biometric information registered in advance in the user terminal 300 (S2400), a password authentication dialog may pop up on the lock screen (S2420).

When the user terminal 300 according to an embodiment of the present disclosure receives biometric information (e.g., a fingerprint) or a password, the user authentication may be performed by comparing the received biometric information or password with the biometric information or password registered in advance in the user terminal 300 (S2500).

The authentication result may be transmitted to the push server 100 (S2600), and the object in the full-screen mode and the authentication dialog are closed (S2700), and as a result, the user terminal may be returned to the lock screen state.

Meanwhile, the displaying of the push message (e.g., authentication dialog) on the lock screen of the user terminal according to an embodiment of the present disclosure (S1200, c) may include a case of displaying the authentication dialog by setting the authentication dialog itself to the full-screen mode in addition to the case of overlaying the object in the full-screen mode on the lock screen (S2200).

The object in the full-screen mode according to an embodiment of the present disclosure may refer to an object generated to fill the screen of the user terminal and a color or image of the object may be variously set.

Figure 6:
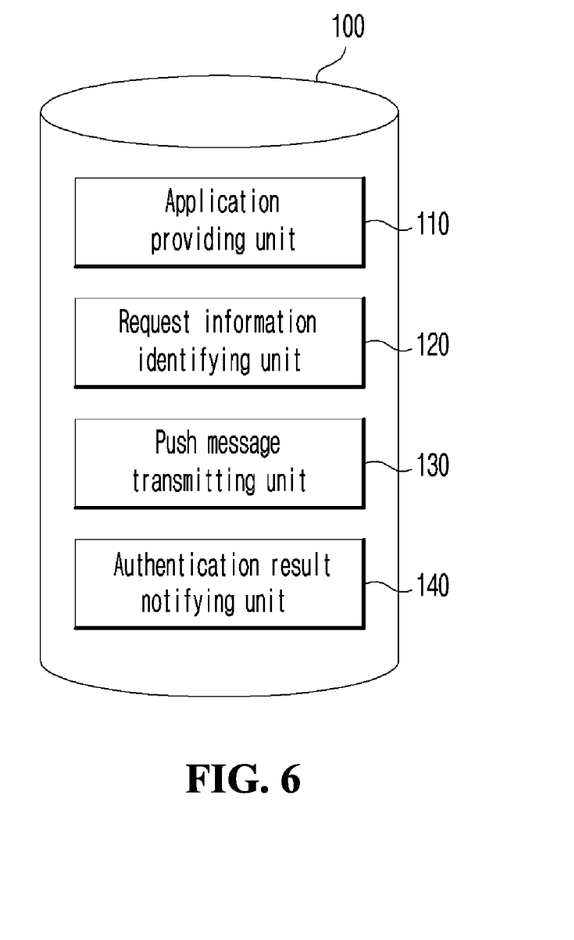
FIG. 6 is a block diagram of a push server according to an embodiment of the present disclosure.

FIG. 6 is a block diagram of a push server according to an embodiment of the present disclosure.

The system for authenticating a user based on a lock screen according to an embodiment of the present disclosure may include a push server 100 that receives identification information of a user who accesses the authentication request server 200 and identification information of the authentication request server, generates the push message based on the identification information, and transmits the push message to the user terminal 300, which corresponds to the identification information of the user.

The push server 100 according to an embodiment of the present disclosure may include an application providing unit 110 for installing an application for performing the user authentication corresponding to the push message in the user terminal 300, wherein the application displays the transmitted push message on the lock screen of the user terminal 300 and receives the biometric information and compares the received biometric information with the biometric information which is pre-stored to perform the authentication of the user, wherein the push server 100 may receive authentication result information for the user from the user terminal 300 and transmit the received authentication result information to the authentication request server 200.

Referring to FIGS. 4 and 6, the push server 100 according to an embodiment of the present disclosure may further include a request information identifying unit 120 that receives the identification information of the user who accesses the authentication request server 200 and identifies whether the identification information corresponds to a user who installs the application in the user terminal, a push message transmitting unit 130 that transmits the push message to the user terminal 300 when the identification information of the user corresponds to the user who installs the application in the user terminal through the request information identifying unit 120, and an authentication result notifying unit 140 that receives the authentication result information of the user performed in response to the push message transmitted from the user terminal 300 and transmits the received authentication result information to the authentication request server 200.

Contents for the method for authenticating a user based on a lock screen may be applied in association with the system for authenticating a user based on a lock screen according to an embodiment of the present disclosure. Accordingly, a description of contents which are the same as the contents regarding the method in association with the system is omitted.

It is to be understood by those skilled in the art related to the embodiment may be implemented as a modified form without departing from an essential characteristic of the present disclosure. Therefore, the disclosed methods should be considered in an illustrative viewpoint rather than a restrictive viewpoint. The scope of the present disclosure is defined by the appended claims rather than by the foregoing description, and all differences within the scope of equivalents thereof should be construed as being included in the present disclosure.

The invention claimed is:

1. A method for authenticating a user for accessing an authentication request server based on a lock screen of a user terminal through a communication network, the method comprising:
   (a) receiving, by a push server, identification information of the user requesting access to the authentication request server and identification information of the authentication request server;
   (b) generating, by the push server, a push message for requesting authentication of the user based on the identification information of the user and the identification information of the authentication request server, and transmitting the push message to the user terminal corresponding to the identification information of the user, wherein the user terminal is separate from the authentication request server and from the push server;
   (c) displaying, by the user terminal, the transmitted push message on the lock screen of the user terminal;
   (d) performing, by the user terminal, the authentication of the user by receiving biometric information of the user and comparing the received biometric information with pre-stored biometric information; and
   (e) receiving, by the push server, authentication result information for the user from the user terminal and transmitting the received authentication result information to the authentication request server,
   wherein in (c) the displaying of the push message on the lock screen of the user terminal, the push message is overlaid on the lock screen, and
   wherein in (d) the performing of the authentication of the user, when the authentication of the user is completed, the overlaid push message is closed, the user terminal is returned to a lock screen state, and the user can access the authentication request server.

2. The method of claim 1, wherein in (c) the displaying of the push message on the lock screen of the user terminal, an object in a full-screen mode is overlaid on the lock screen, and the push message is displayed on the object, and
   wherein in (d) the performing of the authentication of the user, when the authentication of the user is completed, the object in the full-screen mode and the push message are closed, and the user terminal is returned to the lock screen state.

3. The method of claim 1, wherein the authentication request server is at least any one of a financial service server, an entrance management server, a security server, a computing system, a web site server, a content providing server, a cloud server, an IoT hub server, a personal information management server, and a messenger app server.

4. The method of claim 1, wherein the biometric information is at least one of a fingerprint, a voice, an iris, a face image, a vein, and a retina.

5. The method of claim 1, wherein in (d) the performing of the authentication of the user,
when the user terminal additionally receives location information of the user and the location information is included in a predetermined radius, the authentication of the user is performed, and
wherein the location information is acquired through a GPS of the user terminal, information on a base station of a mobile communication network to which the user terminal belongs, and beacon information received by the user terminal.

6. A system for authenticating a user for accessing an authentication request server based on a lock screen of a user terminal through a communication network, the system comprising:
a push server receiving identification information of the user requesting access to the authentication request server and identification information of the authentication request server, generating a push message for requesting authentication of the user based on the identification information of the user and the identification information of the authentication request server, and transmitting the push message to the user terminal corresponding to the identification information of the user,
wherein the push server includes an application providing unit installing an application for performing the authentication of the user in response to the push message in the user terminal,
wherein the application performs the authentication of the user by displaying the transmitted push message on the lock screen of the user terminal, and receiving biometric information of the user and comparing the received biometric information with pre-stored biometric information, and
wherein the push server receives authentication result information for the user from the user terminal and transmits the received authentication result information to the authentication request server,
wherein the push server further includes:
a request information identifying unit receiving the identification information of the user requesting access to the authentication request server and identifying whether the identification information of the user corresponds to a user who installs the application in the user terminal,
a push message transmitting unit transmitting the push message to the user terminal when the identification information of the user corresponds to the user who installs the application in the user terminal through the request information identifying unit, and
an authentication result notifying unit receiving from the user terminal the authentication result information for the user performed in response to the push message transmitted to the user terminal and transmitting the received authentication result information to the authentication request server,
wherein the user terminal is separate from the authentication request server and from the push server,
wherein the push message is displayed and overlaid on the lock screen of the user terminal, and when the authentication of the user is completed, the overlaid push message is closed, the user terminal is returned to a lock screen state, and the user can access the authentication request server.

7. The system of claim 6, wherein the application overlays an object in a full-screen mode on the lock screen of the user terminal, and the push message is displayed on the object, and
wherein when the authentication of the user is completed, the object in the full-screen mode and the push message are closed, and as a result, the user terminal is returned to the lock screen state.

8. The system of claim 6, wherein the authentication request server is at least any one of a financial service server, an entrance management server, a security server, a computing system, a web site server, a content providing server, a cloud server, an IoT hub server, a personal information management server, and a messenger app server.

9. The system of claim 6, wherein the biometric information is at least one of a fingerprint, a voice, an iris, a face image, a vein, and a retina.

10. The system of claim 6, wherein when the application additionally receives location information of the user and the location information is included in a predetermined radius, the authentication of the user is performed, and
wherein the location information is acquired through a GPS of the user terminal, information on a base station of a mobile communication network to which the user terminal belongs, and beacon information received by the user terminal.

* * * * *